May 13, 1969

L. V. COLVSON 3,444,394

RAMP-TYPE WAVEFORM GENERATOR

Filed April 7, 1966

INVENTOR.
L. V. COLVSON
BY
Samuel Kane
ATTORNEY

May 13, 1969   L. V. COLVSON   3,444,394
RAMP-TYPE WAVEFORM GENERATOR
Filed April 7, 1966   Sheet 2 of 2
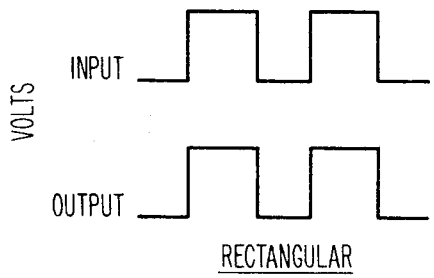
Fig.3 RECTANGULAR
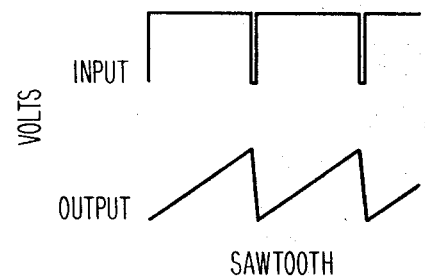
Fig.4 SAWTOOTH
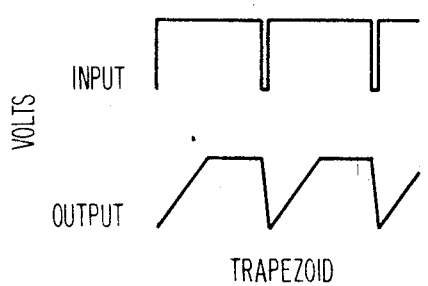
Fig.5 TRAPEZOID
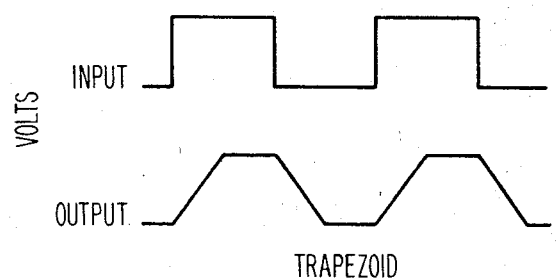
Fig.6 TRAPEZOID
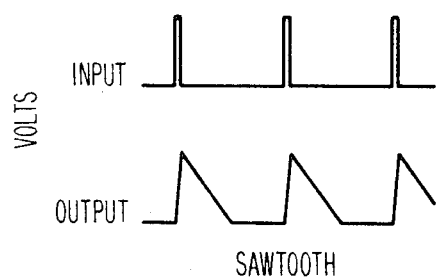
Fig.7 SAWTOOTH
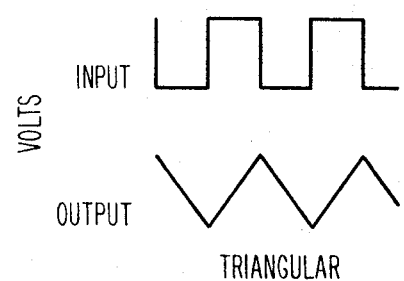
Fig.8 TRIANGULAR
INVENTOR.
L. V. COLVSON
BY
Samuel Kane
ATTORNEY United States Patent Office 3,444,394
Patented May 13, 1969

3,444,394
RAMP-TYPE WAVEFORM GENERATOR
L. V. Colvson, Philadelphia, Pa., assignor to Burroughs Corporation, Detroit, Mich., a corporation of Michigan
Filed Apr. 7, 1966, Ser. No. 541,000
Int. Cl. H03k 5/04
U.S. Cl. 307—261                                   2 Claims

ABSTRACT OF THE DISCLOSURE

An electrical network responsive to a rectangular input waveform includes a capacitor which is charged in the process of producing the leading edge of an output waveform and is discharged in the process of producing the trailing edge of the output waveform. By varying the times that it takes the waveforms to move from one level to another and by varying the duration of the input waveform, various output waveforms including rectangular, sawtooth, trapezoidal and triangular waveforms may be obtained. The times that it takes the output waveform to move from one level to another are varied by varying the value of the capacitor and certain resistors in accordance with stated formulas.

---

This invention relates generally to waveform generators and more particularly to generators of ramp-type waveforms. While not limited thereto, the invention finds special application as a low-level teletype line driver. When so used, the apparatus of the invention is connected between the teletype transmitter and the long teletype line which is connected to the receiver.

A teletype line is an open line. This type of line is known in the art as one which is not protected by either metallic or mu metal shielding. A metallic shield is known in the art as one which protects the line so as to minimize the radiation of electromagnetic energy from the line. A mu metal shield is known in the art as one which protects the line so as to minimize the radiation of magnetic energy in or around the outside of the line.

An object of the invention is to provide a waveform generator by means of which transmission of data may be achieved over open lines, while at the same time minimizing the two forms of energy radiation discussed, and minimizing harmonic distortion in the waveform which finally reaches the receiver.

Another object of the invention is to provide improvements in waveform generators.

A further object of the invention is to provide an improved ramp-type waveform generator.

Another object of the invention is to provide a waveform generator which affords precise control over rise and fall times of the waveform.

Another object of the invention is to provide a ramp-type pulse generator whereby the duration of the output pulse may be varied to an unlimited extent.

A more specific object of the invention is to provide a waveform generator having particular, but not limited, utility in the transmission of cryptic data over long teletype lines.

In accordance with the above objects and considered first in one of its broader aspects, a waveform generator constructed in accordance with the invention may comprise a switching means having an input terminal and an output terminal and which is adapted to be actuated by current to change the voltage level of the output terminal. The output terminal is placed at a first voltage level, and first and second impedance means are connected to the input terminal for conducting current to the switching means to change the voltage at the output terminal to a second level. A capacitor which has a capacitor current charging path and discharging path is connected at one end to the output terminal of the switching means, and further means is provided for connecting the other end of the capacitor to the first and second impedance means whereby capacitor current in one of the charging and discharging paths flows through the connecting means and the first impedance means and substantially bypasses the second impedance means and capacitor current in the other of the charging and discharging paths flows through the first and second impedance means and substantially bypasses the connecting means.

Figure 1:
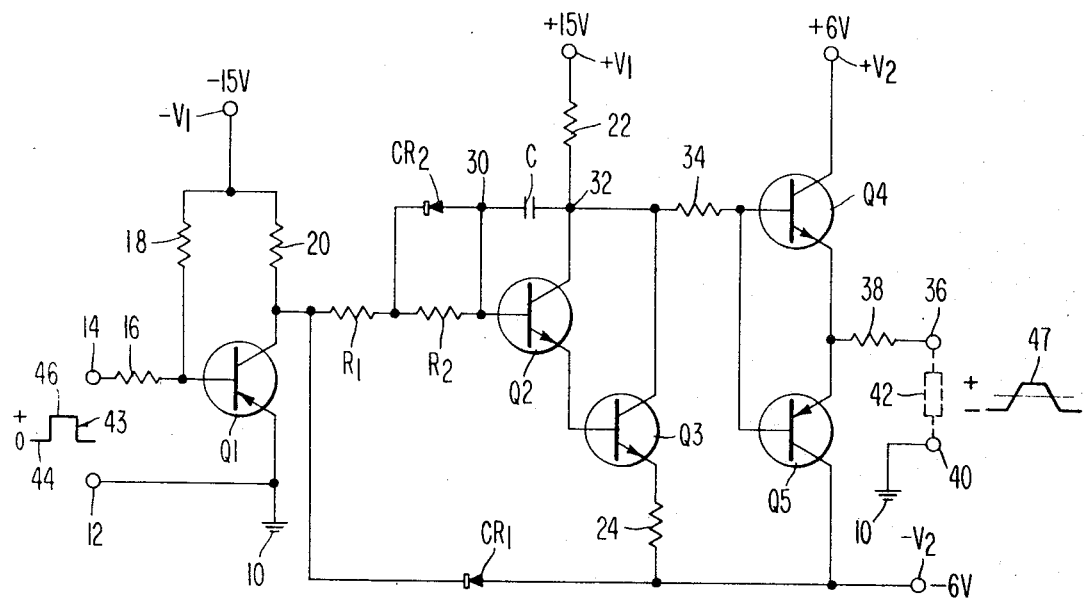
Figure 2:
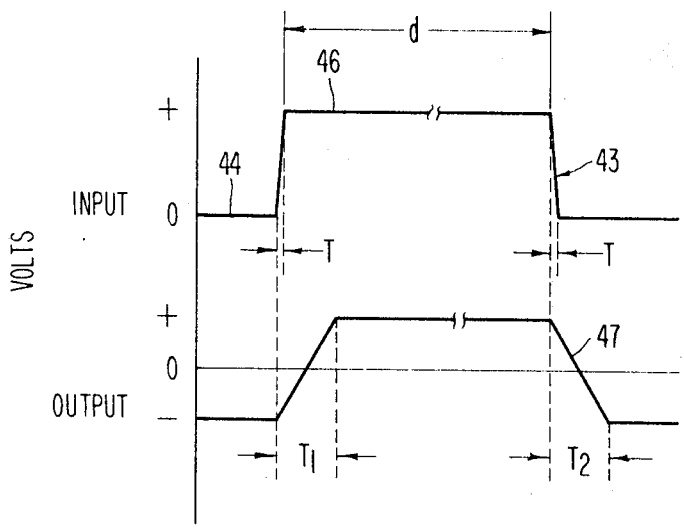

The invention will be more clearly understood when the following detailed description of the preferred embodiment thereof is read in conjunction with the accompanying drawings in which FIG. 1 is a schematic diagram of a ramp-type waveform generator constructed in accordance with the invention;

FIG. 2 illustrates input and output waveforms associated with the generator of FIG. 1, and FIGS. 3 to 8 illustrate various input waveforms and their corresponding output waveforms which may be produced with the apparatus of FIG. 1.

Turning now to the detailed description, the invention employs a plurality of switching devices illustrated in one form in this embodiment of the invention in FIG. 1 of the drawings as transistors Q1, Q2, Q3, Q4 and Q5.

The emitter electrode of transistor Q1 is connected to a point of reference potential 10 and to an input terminal 12. The base electrode of transistor Q1 is connected to the other input terminal 14 through a resistor 16 and to a source of negative potential $-V_1$ through a resistor 18. The collector electrode of transistor Q1 is also coupled to the source of potential $-V_1$ through a resistor 20.

The collector electrodes of transistors Q2 and Q3 are interconnected and coupled to a source of positive potential $+V_1$ through a resistor 22. The emitter electrode of transistor Q2 and the base electrode of transistor Q3 are interconnected and the emitter electrode of transistor Q3 is returned to a source of negative potential $-V_2$ through a resistor 24.

Connected between the collector electrode of transistor Q1 and the negative source of potential $-V_2$ is an asymmetrical current conducting device illustrated here in one form as a diode $CR_1$. Two resistors $R_1$ and $R_2$ are connected in series, with one end of the resistor $R_1$ coupled to the cathode of the diode $CR_1$ and to the collector electrode of transistor Q1. Resistor $R_2$ is connected to the base electrode of transistor Q2 and has shunted across its terminals a second asymmetrical current conducting device illustrated here in the form of a diode $CR_2$. A capacitor C has one of its plates connected to the junction 30 of the diode $CR_2$ and the base electrode of transistor Q2 and its other plate connected to the junction 32 of resistor 22 and the collector electrodes of transistors Q2 and Q3, the junction 32 constituting an output terminal of transistors Q2 and Q3.

The base electrodes of transistors Q4 and Q5 are interconnected and coupled to the junction 32 through a resistor 34. The collector electrode of transistor Q4 is returned to a source of positive potential $+V_2$ and the collector electrode of transistor Q5 is returned to the source of negative potential $-V_2$. The emitter electrodes of transistors Q4 and Q5 are interconnected and coupled to one of the output terminals 36 through a resistor 38. The other output terminal 40 is returned to the point of reference potential 10. The reference potential 10 supplies a bias to the emitter electrodes of transistors Q4 and Q5 through the impedance of a load 42, when the load 42 is connected to the circuit.

Assuming that the circuit is in a steady state condition corresponding to low signal input level, the circuit operates as follows.

All transistors, except transistor Q4, are turned on and are conducting, and diodes $CR_1$ and $CR_2$ are reverse biased. Transistors Q2 and Q3 are operated in the saturating mode so that for all practical purposes the small voltage across capacitor C may be regarded as 0 volts, or in other words, this capacitor may be considered to be, at this time, in a discharged condition. The output voltage across the load 42 may be regarded as being approximately at the level $-V_2$, since the resistor 38, in the present embodiment of the invention, has a low ohmic value. A part of the collector-emitter current of transistor Q1 is flowing through the resistor 20 and another part of this current is flowing through resistors $R_1$ and $R_2$ to provide forward biasing base current for the transistors Q2 and Q3.

When the input signal 43 moves in the positive direction from the low level 44 to the high level 46, transistor Q1 will turn off and the potential of its collector will move in the negative direction until it is clamped to $-V_2$ by the diode $CR_1$, the latter now being forward biased. This results in a slight reverse bias across the base-emitter junctions of transistors Q2 and Q3 so that these transistors now try to turn off. As transistors Q2 and Q3 try to turn off, their collector potentials will begin to rise toward $+V_1$ so that the capacitor C will now commence charging. The charging current will take three paths: one path through the diode $CR_2$ and resistors $R_1$ and 20 to the source $-V_1$, a second path through resistors $R_2$, $R_1$ and 20 to the source $-V_1$, and a third path directly down to the base of transistor Q2 and through transistors Q2 and Q3, and the resistor 24 to the source $-V_2$. Because of the low forward resistance of the diode $CR_2$, charging current in the second path will be negligible, so that the resistor $R_2$ may be considered to be substantially by-passed by the charging current flowing through the diode $CR_2$.

The charging current in the third path tends to hold transistors Q2 and Q3 on, however, as the capacitor C charges up and charging current in this third path becomes less and less, the collector potentials of transistors Q2 and Q3 will increase more and more toward $+V_1$ until a point is reached at which the capacitor C is fully charged, at which point transistors Q2 and Q3 are turned off.

The collector electrodes of transistors Q2 and Q3 will now be a positive potential, thereby turning transistor Q5 off, and with base current flowing through transistor Q4 from the source $+V_1$, the resistor 22 and the resistor 34, thereby turning transistor Q4 on. The output voltage across the load 42 will now be approximately at the level of $+V_2$.

When the trailing edge of the input signal 43 moves in the negative direction to the low input level 44, the capacitor C will be discharged through a path including the point of reference potential 10, transistor Q1, resistors $R_1$ and $R_2$ capacitor C, transistors Q2 and Q3, resistor 24 and the negative source of potential $-V_2$, and the circuit will return to the assumed condition corresponding to the low input level 44.

Thus, with a rectangular input waveform 43 (FIGS. 1 and 2), the apparatus will generate a ramp-type output waveform 47. By varying the times T (FIG. 2) that it takes the input pulse to move from one level to another, and by varying the duration $d$ of the input pulse, and the times $T_1$ and $T_2$ for the output signal to move from one level to another, various output waveforms such as illustrated in FIGS. 3–8 may be obtained.

It has been found that the waveform generator circuit will operate most reliably when the times T, $T_1$ and $T_2$, in seconds, are selected to fall within the following critical limits:

$$10^{-4} \geq T \geq 10^{-6}$$

$T_1$ or $T_2 =$ (approx.) $10^{-6}$ minimum, $10^{-2}$ maximum.

Different values for the times $T_1$ and $T_2$ may be obtained by varying the values of the capacitor C and the resistors $R_1$ and $R_2$ in accordance with the following formulas:

$$\Delta T_1 = \frac{\Delta V}{E_1} R_1 C$$

$$\Delta T_2 = \frac{\Delta V}{E_2} (R_1 + R_2) C$$

$$\Delta V = |+V_2| + |-V_2|$$

$$E_1 = V_{beQ2} + V_{beQ3} + V_{CR_1} - V_{CR_2}$$

and $$E_2 = -V_2 - V_{beQ2} + V_{beQ3}$$

and where $V_{beQ2}$ is the base-emitter voltage of transistor Q2,
$V_{beQ3}$ is the base-emitter voltage of transistor Q3,
$V_{CR_1}$ is the voltage across the diode $CR_1$, and
$V_{CR_2}$ is the voltage across the diode $CR_2$.

While there has been shown and described a particular waveform generator to exemplify the principles of the invention, it is to be understood that this is but one embodiment thereof, and that the invention is capable of being constructed in various forms and modifications without departing from the true spirit and scope thereof. Accordingly, it is to be understood that the invention is not to be limited by the specific waveform generator described, but only by the subjoined claims.

What is claimed is:

1. A waveform generator comprising a junction transistor having a base electrode, an emitter electrode and a collector electrode,
    first and second impedance means interconnected and arranged to conduct a first current to said base electrode,
    a capacitor connected at one end to said collector electrode and at its other end to one of said impedance means,
    an asymmetrical current conducting device shunted across one of said impedance means,
    means including a second transistor having a collector electrode connected to one of said impedance means for supplying said first current,
    a source of potential coupled to said emitter electrode, and
    a second asymmetrical current conducting device connected between said source of potential and the junction of said second transistor collector electrode and said one of said impedance means, said second asymmetrical current conducting device being nonconductive when said second transistor is supplying said first current and operative to become conductive when said second transistor and said first current are cut off to limit a reverse bias across the base-emitter junction of said junction transistor.

2. A waveform generator comprising a junction transistor having a base electrode, an emitter electrode and a collector electrode, said collector electrode constituting an output terminal,
    circuit means connected to said output terminal and operable to place said output terminal at a first voltage level,
    first and second impedance means connected in series and the series combination connected directly at one end to the base electrode of said junction transistor for conducting a first current to said junction transistor to change the voltage at said output terminal to a second level,
    a capacitor connected at one end to said output terminal,
    a first asymmetrical current conducting device connected to the other end of said capacitor and shunting one of said impedance means and poled so that capacitor current in a first charging path flows through said first asymmetrical current conducting device and said first impedance means and substantially bypasses said second impedance means and capacitor current in a second charging path flows through the base-emitter junction of said junction transistor, a second transistor having a collector electrode coupled to said first impedance means for supplying said first current, a source of potential coupled to said emitter electrode, and a second asymmetrical current conducting device connected between said source of potential and the junction of said second transistor collector electrode and said first impedance means, said second asymmetrical current conducting device being nonconductive when said second transistor is supplying said first current and operative to become conductive when said second transistor and said first current are cut off to limit a reverse bias across the base-emitter junction of said junction transistor, and wherein capacitor current in a discharging path flows through said second transistor and said first and second impedance means and at least two of the electrodes of said junction transistor and substantially bypasses said first asymmetrical current conducting device.

References Cited

UNITED STATES PATENTS

| | | | |
|---|---|---|---|
| 2,879,392 | 3/1959 | Mudie | 328—181 XR |
| 3,163,829 | 12/1964 | Ladd | 307—255 XR |

ARTHUR GAUSS, *Primary Examiner.*

JOHN ZAYWORSKY, *Assistant Examiner.*

U.S. Cl. X.R.

307—228, 237, 263, 268; 328—127, 181